United States Patent
Kalekar et al.

(10) Patent No.: US 11,794,677 B2
(45) Date of Patent: Oct. 24, 2023

(54) BUMPER ARRANGEMENT FOR A MOTOR VEHICLE

(71) Applicant: BENTELER AUTOMOBILTECHNIK GMBH, Paderborn (DE)

(72) Inventors: Umesh Kalekar, Paderborn (DE); Elmar Mollemeier, Delbrueck (DE); Mirko Paare, Paderborn (DE); Martin Schroeter, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 83 days.

(21) Appl. No.: 17/500,094

(22) Filed: Oct. 13, 2021

(65) Prior Publication Data

US 2022/0111810 A1    Apr. 14, 2022

(30) Foreign Application Priority Data

Oct. 14, 2020  (DE) .......................... 102020127056.9

(51) Int. Cl.
  *B60R 19/18*    (2006.01)
  *B60R 19/34*    (2006.01)

(52) U.S. Cl.
  CPC .............. *B60R 19/18* (2013.01); *B60R 19/34* (2013.01)

(58) Field of Classification Search
  CPC ................................. B60R 19/18; B60R 19/34
  See application file for complete search history.

(56) References Cited

U.S. PATENT DOCUMENTS

| 10,023,140 B2 * | 7/2018 | Arns ...................... B60R 21/34 |
| 10,407,009 B2 | 9/2019 | Lindblom |
| 2004/0007886 A1 | 1/2004 | Hallergren |
| 2007/0176438 A1 | 8/2007 | Tornberg |
| 2011/0031769 A1 | 2/2011 | Loeeffler |

FOREIGN PATENT DOCUMENTS

| CN | 201784558 U | 4/2011 |
| CN | 104494546 A | 4/2015 |
| CN | 104773123 A | 7/2015 |
| CN | 206394587 U | 8/2017 |
| DE | 602005004514 T2 | 1/2009 |
| DE | 102010031089 A1 | 1/2012 |
| DE | 202016104012 U1 | 10/2016 |
| EP | 2082924 A1 | 7/2009 |

(Continued)

OTHER PUBLICATIONS

Office Action for German Application No. 10 2020 127 056.9 dated Jun. 16, 2021; 11pp.

(Continued)

*Primary Examiner* — Dennis H Pedder
*Assistant Examiner* — Melissa Ann Bonifazi
(74) *Attorney, Agent, or Firm* — HAUPTMAN HAM, LLP

(57) ABSTRACT

A bumper arrangement for a motor vehicle, having a crossmember which is able to be coupled to a motor vehicle by means of crash boxes. The crossmember is designed as a hollow profile which is open on one side. An opening of the hollow profile faces forwards. The crossmember is designed in its end portions to run with an orientation obliquely downwards with respect to the vertical direction.

18 Claims, 11 Drawing Sheets

(56) References Cited

FOREIGN PATENT DOCUMENTS

| FR | 2345336 A2 | 10/1977 |
|---|---|---|
| JP | 2017081239 A | 5/2017 |
| JP | 2017171134 A | 9/2017 |
| WO | 0230714 A1 | 4/2002 |
| WO | 2017044035 A1 | 3/2017 |

OTHER PUBLICATIONS

Office Action for European Application No. 21201177.9 dated Jan. 12, 2023; 6pp.
European Office Action for European Application No. 21201177.9 dated Sep. 26, 2022; 8pp.
Search Report for European Application No. 21201177.9 dated Feb. 4, 2022; 12pp.
Office Action for European Application No. 21201177.9 dated May 19, 2023; 12pp.

\* cited by examiner

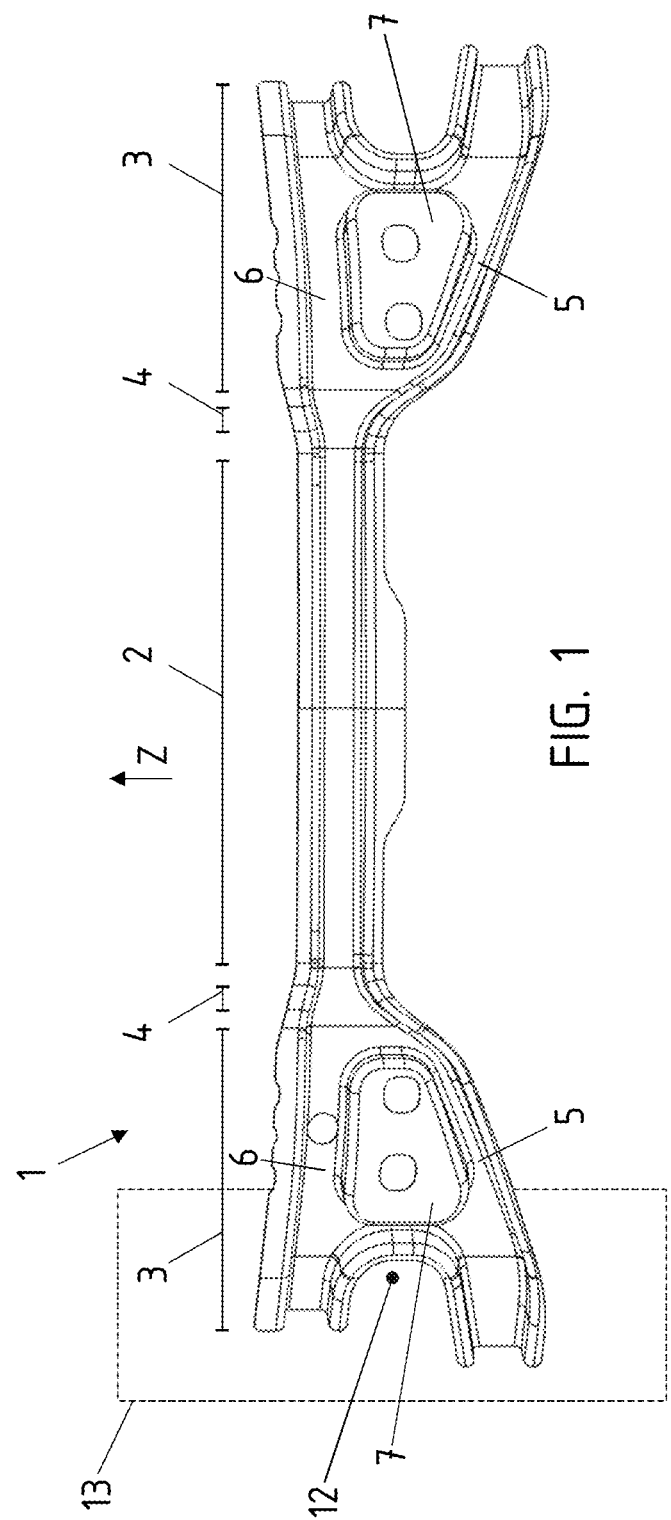
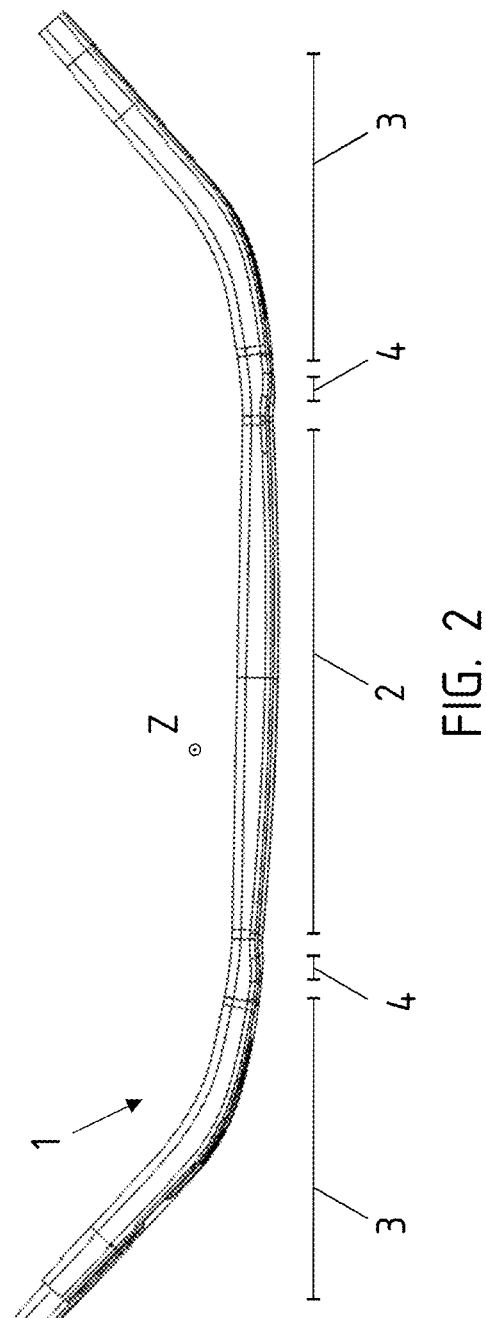
FIG. 1
FIG. 2

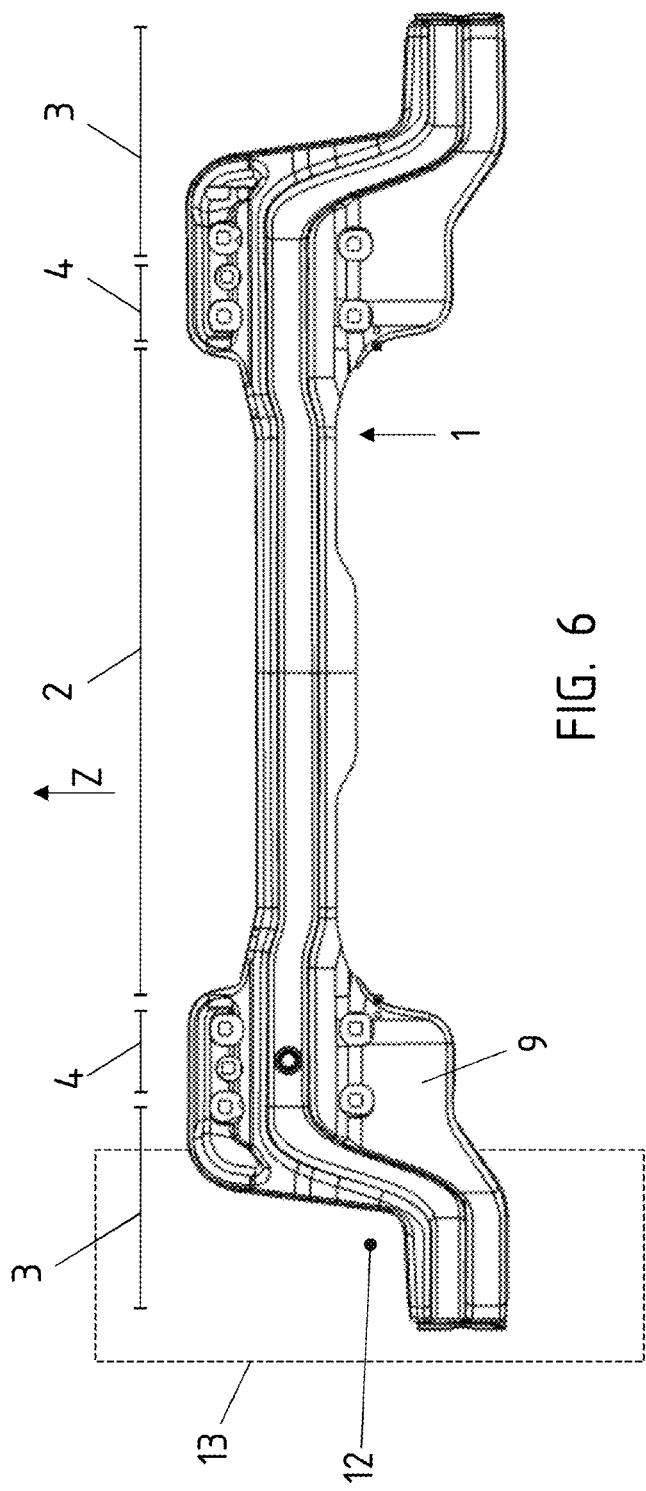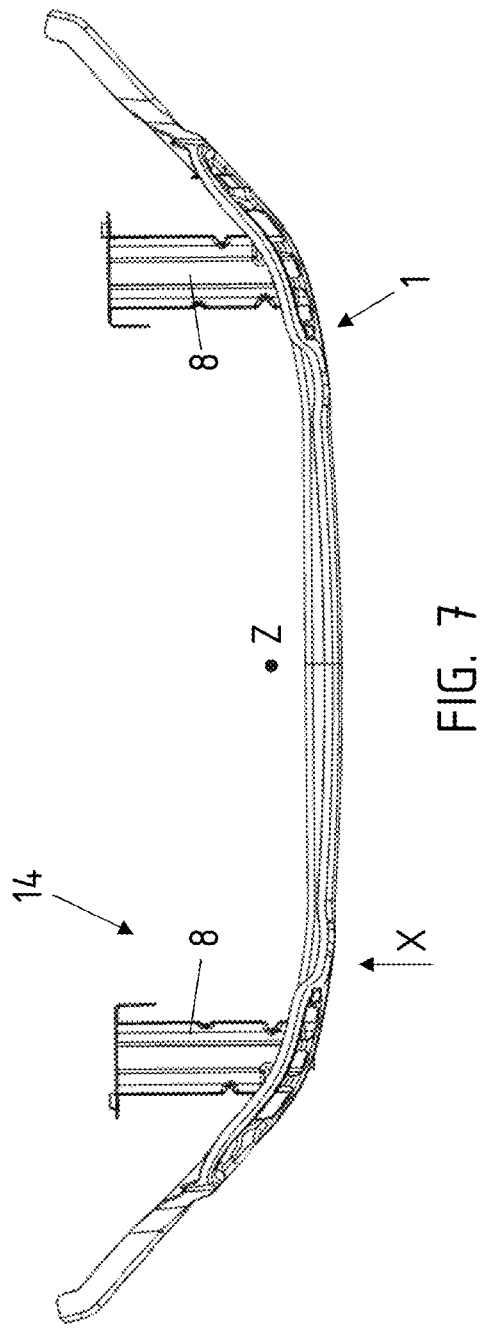

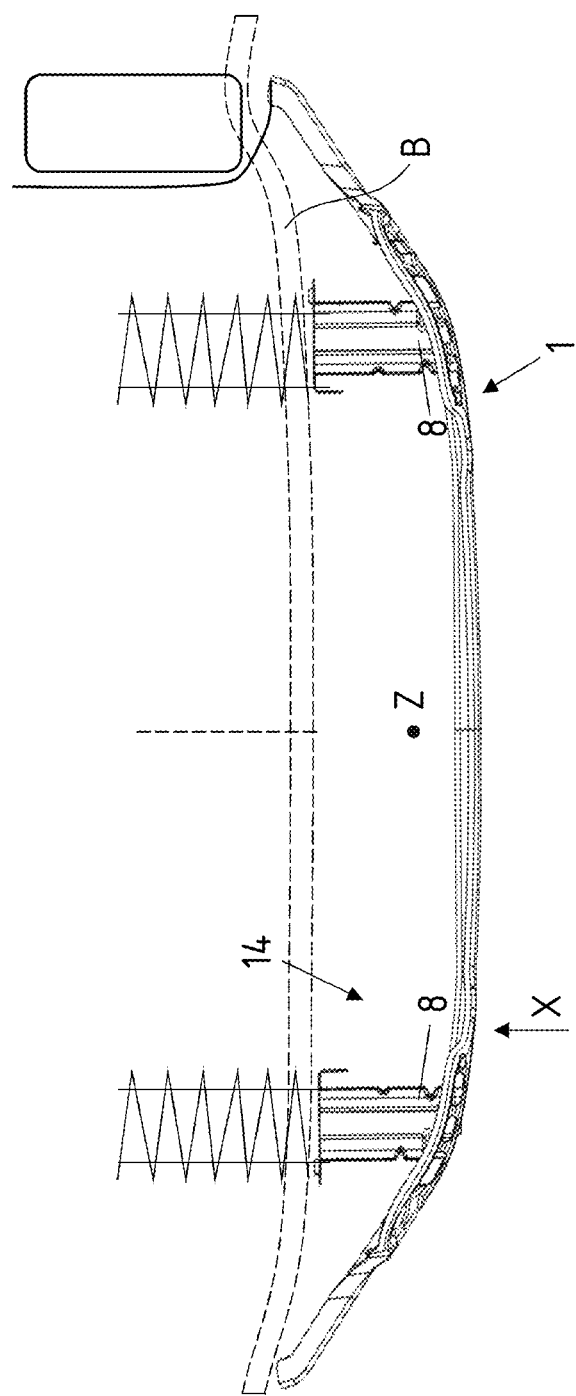

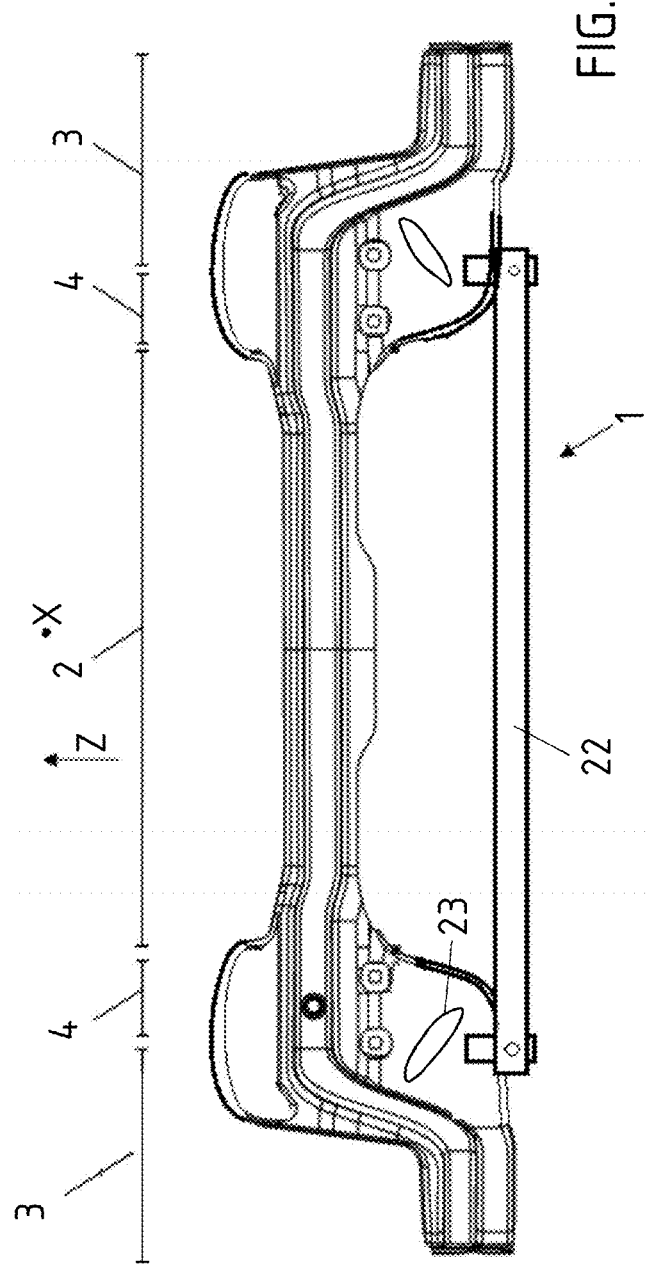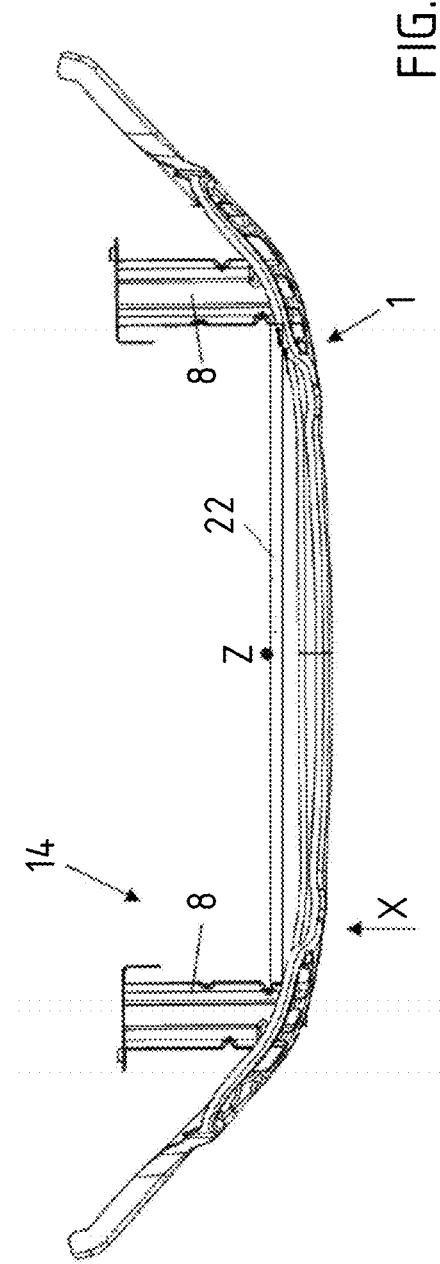

BUMPER ARRANGEMENT FOR A MOTOR VEHICLE

RELATED APPLICATIONS

The present application is a German Application Number 10 2020 127 056.9 filed Oct. 14, 2020, the disclosure of which is hereby incorporated by reference herein in its entirety.

FIELD

The present disclosure relates to a bumper arrangement for a motor vehicle.

BACKGROUND

Motor vehicles have bumper arrangements at the front and end. In the event of a vehicle crash or a collision or even an impact against an object, two tasks are carried out by such a bumper arrangement. Firstly, there is a crossmember. The crossmember is sufficiently rigid to prevent a corresponding object or a motor vehicle from penetrating to too great an extent into the front or end region. Consequently, a possibly punctiform impact, for example against a post, is transmitted by the crossmember to a large portion of the motor vehicle width.

A second task which is carried out by a bumper arrangement is to convert crash energy into deformation work and to thereby correspondingly reduce the impact energy. For this purpose, a respective crossmember is coupled to the motor vehicle via crash boxes. For this purpose, the crash boxes are arranged between a central region and an end region of the crossmember, with respect to the transverse direction of the motor vehicle, and, consequently, with respect to the width of the motor vehicle, are each arranged between a third and a quarter of the length in the outer region of the crossmember. The crash boxes are then generally coupled to longitudinal members of the motor vehicle. In the event of an impact, the crash boxes hold, for example, in the manner of a concertina and thus convert crash energy into deformation work.

SUMMARY

An object of the present disclosure is to provide a bumper arrangement which, in the event of penetration of an impacting object or motor vehicle, brings about an even distribution so as to reduce peaks both in the specific vehicle and in a barrier.

An object of the present disclosure to provide a bumper arrangement which has an improved crash behavior in the event of an offset crash.

The present disclosure is achieved by a bumper arrangement.

The bumper arrangement for a motor vehicle has a crossmember which is able to be coupled to a motor vehicle via or by means of crash boxes. The crossmember is designed as a hollow profile which is open on one side, wherein an opening of the hollow profile faces forwards. This means that the opening of the hollow profile faces away from the motor vehicle, in an orientation in the longitudinal direction of the motor vehicle, and consequently faces forwards in the main direction of travel. The arrangement is able to be installed at a vehicle rear. In this case, the opening faces rearward. According to the disclosure, the crossmember is designed in its end portions to run with an orientation obliquely downwards with respect to the vertical direction.

Within the context of the disclosure, this means that the end portions each extend over approx. 10 to 30% of the entire length of the crossmember. The entire end portion, rather than only an outer end, is designed to run with an orientation obliquely downwards with respect to the vertical direction. Within the context of the disclosure, the orientation obliquely downwards is achieved by oblique bending downwards. In a variant embodiment, the orientation running obliquely downwards is formed by a S-shaped profile. In a further embodiment variant, the orientation running obliquely downwards is formed by a Y shape, with a respective lower limb of the Y shape being designed to run with an orientation obliquely downwards.

The main profile of the hollow profile is designed in the end region to run with an orientation obliquely downwards. At least, however, a profile cross section which corresponds to at least 50%, 60% of the profile cross section in its dimensioning of the central portion is designed to run with an orientation obliquely downwards. The profile cross section represents the geometrical dimensions of the cross section. means the profile depth which, in the installed state, is arranged with an orientation in the longitudinal direction of the motor vehicle. Said depth is reduced by a maximum of 30%. This means that approximately the same depth in the longitudinal direction of the motor vehicle is formed in each cross section of the hollow profile over the length thereof. In the end portion, the crossmember has at most a depth reduced by 30%. This means that, in the end portion, the hollow profile is designed to be either identical in depth or less deep, and consequently smaller in its extent in the longitudinal direction of the motor vehicle than in a central portion, but the profile depth is at maximum 30% smaller.

By this means, according to the disclosure, in the event of a vehicle crash, for example, an offset crash, at least an outer end or a greater portion of the end portion is arranged below a wheel center point, which is located behind the wheel center point, with respect to the vertical direction of the motor vehicle. If another vehicle or an object now strikes against the crossmember, the latter is moved in the direction of the vehicle wheel with crash box or/or longitudinal member being deformed. First of all, the crossmember and possibly parts located behind the crossmember then intrude into the wheelhouse and, upon further deformation, then strike against the wheel itself. Owing to the fact that the end portion is arranged below the wheel center point, the crossmember here is virtually supported on the wheel. The wheel in conjunction with the wheel suspension provides an additional load path and resistance against further intrusion of the object or colliding motor vehicle in the direction of the passenger compartment. The object or the other motor vehicle is thus conducted away towards the side with respect to the transverse direction of the motor vehicle. additional load path in the longitudinal direction of the motor vehicle is produced as an addition to the load path via the main longitudinal members. The crossmember end region upon striking against an object is thus first of all pressed against the wheel arch and in turn then against the wheel. The wheel is first of all supported via the wheel suspension. In the event of a greater impact and associated deformation, the wheel is pressed against the motor vehicle sill, which is oriented in the longitudinal direction, thus resulting in a further load path. The minimum length of the end region in the transverse direction of the motor vehicle is therefore designed in such a manner that, in the event of deformation in the longitudinal direction of the motor vehicle, i.e. pressing rearwards, the end region reliably strikes against the wheel. For this purpose, in the transverse direction, at least half of a wheel is overlapped by an end of the crossmember. The end region of the crossmember does not slide away above the wheel. This would be the case if the crossmember is not designed in its end portions to run with an orientation obliquely downwards since then the end portions of the crossmember would be arranged level with the wheel center point or above the latter. A crossmember sliding away above the wheel, with respect to the vertical direction, an intruding vehicle is correspondingly jacked up onto the wheel or the motor vehicle.

In another embodiment, the crossmember is virtually hooked below the wheel center point is that an impacting object is thereby reliably conducted away to the outside in the transverse direction of the motor vehicle.

The crash boxes are arranged in a connecting region between a central region and the end regions of the crossmember. Consequently, the crash boxes are arranged in a region of between 10 and 90%, between 20 and 80%, or even of between 30 and 70%, with respect to the longitudinal direction of the crossmember. The end region of the crossmember coming from the central region then begins directly after the crash boxes in the longitudinal direction of the crossmember and is arranged to run downwards. However, the end region is able to begin in the connecting regions of the crash boxes with respect to the longitudinal direction.

In a embodiment variant, the hollow profile is able to be coupled at least in sections to a closing panel. A plurality of closing panels are also able to be arranged. The crossmember itself is designed in cross section as a top-hat profile. The top-hat profile then has flanges protruding with an orientation upwards and downwards. The flanges are also used as a coupling to a closing panel.

In a further embodiment variant, the end regions are enlarged in their area with respect to the vertical direction of the motor vehicle. This is able to be brought about by enlarging the cross section. However, for example, the flanges present on the closing panel is able to be designed to be larger. The enlarged area provides an enlarged impact surface against the wheel. By this means, in turn, better support is produced in the event of a crash when the crossmember presses against the vehicle wheel.

The crossmember is furthermore designed to run in a curved manner about the vertical axis. A curvature of the end regions is designed to be greater in relation to a curvature of the central region. The effect in turn achieved by this is that, in the event of a crash, consequently in the event of deformation in the longitudinal direction of the motor vehicle, the respective end region of the crossmember already lies against the wheel at an earlier time and therefore more extensive support is realized here. Alternatively or in addition, the central region is designed to run substantially parallel to a ZY plane of the motor vehicle. The respective end region has a corresponding angle with respect to the ZY plane. This angle is between 1 and 30 degrees, between 10 and 20 degrees. The respective end region, for example, also is also able to run in a curved manner here.

In a further embodiment variant, the crash boxes engage around the top-hat shape from the rear in such a manner that an upper and a lower part of the crash box overlaps the top-hat shape and lies against the rear side of a front wall or of the flange on the crossmember.

The crossmember itself or the main shell of the crossmember itself is produced as a single-part formed component from a steel alloy, as a press-formed component. For this purpose, hot forming and press hardening technology is able to be used, and therefore the crossmember has high strength not only because of its geometry, but also because of its material. The crossmember is able to have a tensile strength of greater than 1500 MPa, greater than 1600 MPa, greater than 1700 MPa.

The crossmember itself is able to be assigned an auxiliary crossmember. The auxiliary crossmember is then arranged below the crossmember with respect to the vertical direction. The auxiliary crossmember is able to be coupled in turn to the end portions running with an orientation downwards; and is able to be arranged at the outer end and coupled to the main crossmember. The auxiliary crossmember is also able to be formed in one piece with, and in the same material as, the main crossmember. Thus, for example, the crossmember and the auxiliary crossmember are cut to size from a sheet metal plate and produced by forming.

BRIEF DESCRIPTION OF THE DRAWINGS

Further features, properties and aspects of the present disclosure are the subject matter of the following description.

FIG. 1 a front view of the crossmember according to the disclosure,

FIG. 2 a top view of the crossmember according to the disclosure,

DETAILED DISCLOSURE

Figure 3:
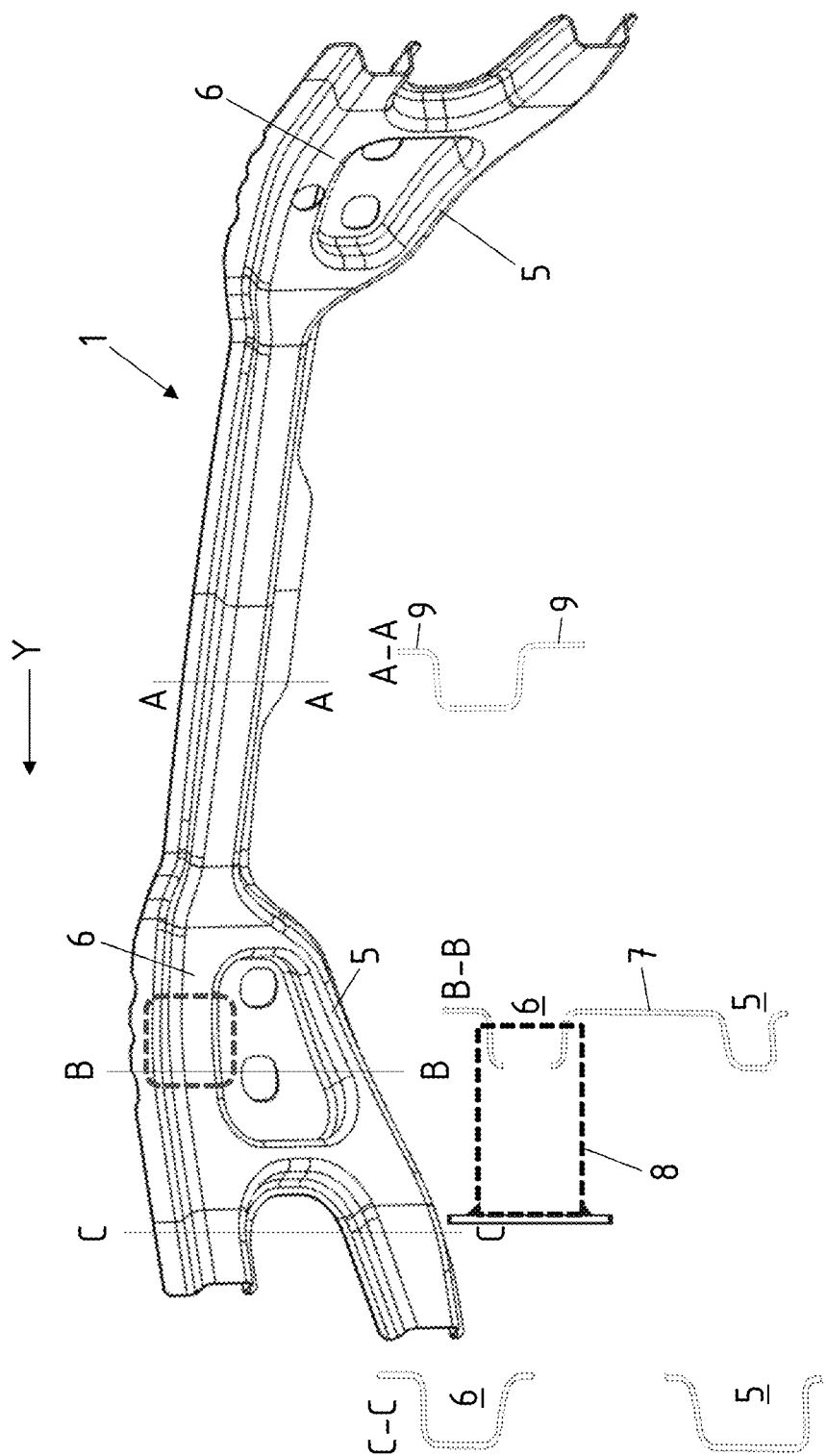
FIG. 3 a rear view of the crossmember according to the disclosure.

In the figures, the same reference signs are used for similar or identical components although a repeated description is omitted for reasons of simplification.

FIG. 1 and FIG. 2 show a crossmember 1 according to the disclosure in a front view and top view. The crossmember 1 or the main shell, illustrated here, of the crossmember 1 is designed as a press-formed component. In cross section, the latter in its central region 2, has a top-hat-shaped profile. Connecting regions 4 for crash boxes, not yet illustrated here, are formed between the central region 2 and end portions 3. The end portions 3 are designed to run with an orientation obliquely downwards with respect to the vertical direction Z of the motor vehicle. The end portions 3 themselves are of Y-shaped design, wherein one limb 5 of the Y shape, which limb is arranged at the bottom with respect to the vertical direction Z, is designed to run in each case with an orientation obliquely downwards. The top-hat shape also continues in the limb 5 itself. At least, however, the top-hat shape in the region of the limb 5 has a cross section here which corresponds to substantially 50% (in its dimensioning) of the main cross section in the central region 2. Furthermore, a cup region 7 is formed between the upper limb 6 and the lower limb 5. This enlarges the area with which the end portions 3 would strike against a wheel 13 located behind them.

A motor vehicle wheel or wheel 13 is illustrated by dashed lines on the left with respect to the plane of the image. The end region or the outer end of the end region of the lower limb 5 lies here below a wheel center point 12 with respect to the vertical direction Z of the motor vehicle. If the outer end region is now deformed due to deformation in the longitudinal direction X of the motor vehicle, said end region strikes against the wheel 13.

FIG. 2 as a top view shows that a curvature is formed about the vertical direction Z of the motor vehicle. The curvature is small in the central region and is significantly greater in the end regions. In the event of a motor vehicle crash in the longitudinal direction X of the motor vehicle, the respective end portion 3 thus strikes against a wheel 13 arranged behind the wheel 13 in the longitudinal direction X of the motor vehicle. This necessitates the wheel suspension to simultaneously also be used as an additional support. Therefore, support is not only provided via the crash box 8 and energy dissipated, but the crossmember 1 is also supported on the wheel 13.

FIG. 3 shows a rear view of the crossmember 1 according to the disclosure, or the main shell of the crossmember 1, and three cross-sectional views. A connecting position is illustrated by dashed lines offset with respect to the transverse direction Y of the motor vehicle, and a crash box 6 is also shown in the central cross-sectional view. According to the intersecting line A-A that the central region 2 is of top-hat-shape design in cross section with a flange 9 protruding upwards and downwards. According to B-B, an upper limb 6 and a lower limb 5 are formed. The lower limb 5 has a cross-sectional geometry which corresponds to at least 50% of the main cross section of the top-hat shape in the central region 2. A cup base or cup region 7 is formed between upper limb 6 and lower limb 5 in order to enlarge the cross-sectional area. The outer ends of the limbs 5, 6 are illustrated in the cross-sectional view C-C and are each of top-hat-shape design.

Figure 4:
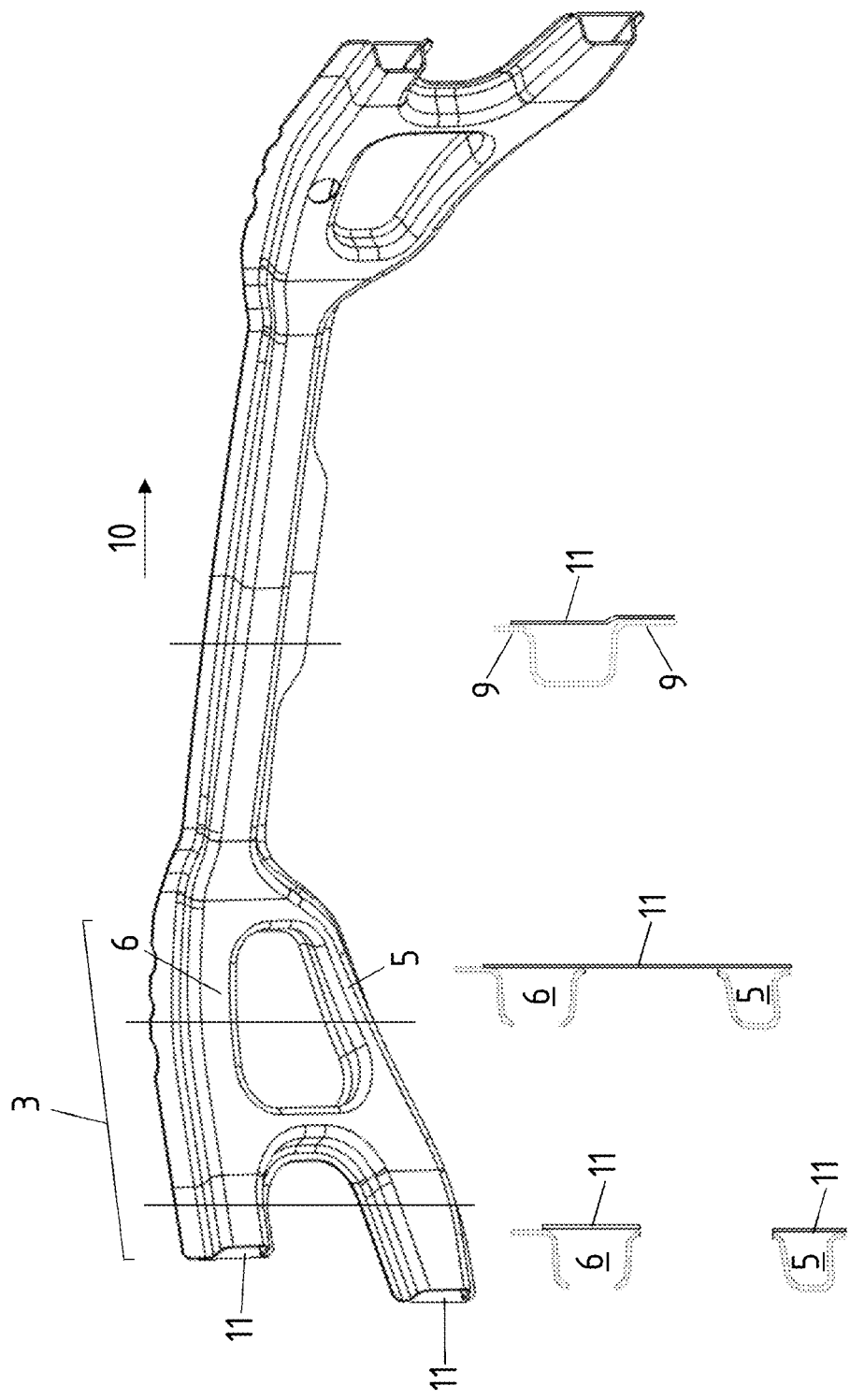
FIG. 4 an alternative embodiment variant of FIG. 3 according to the disclosure.

FIG. 4 shows an alternative embodiment variant of FIG. 3. This illustrates a respective closing panel or a plurality of closing panels 11 since the closing panel is also able to be of multi-part design in the longitudinal direction 10 of the crossmember 1. The cup region 7 between upper and lower limb 5, 6 has been omitted since this region is overlapped by a closing panel 11. The closing panel 11 is coupled in each case to the flanges 9 of the top-hat shape. In the end region, the cross-sectional area against which an obstacle strikes is thus enlarged.

Figure 5:
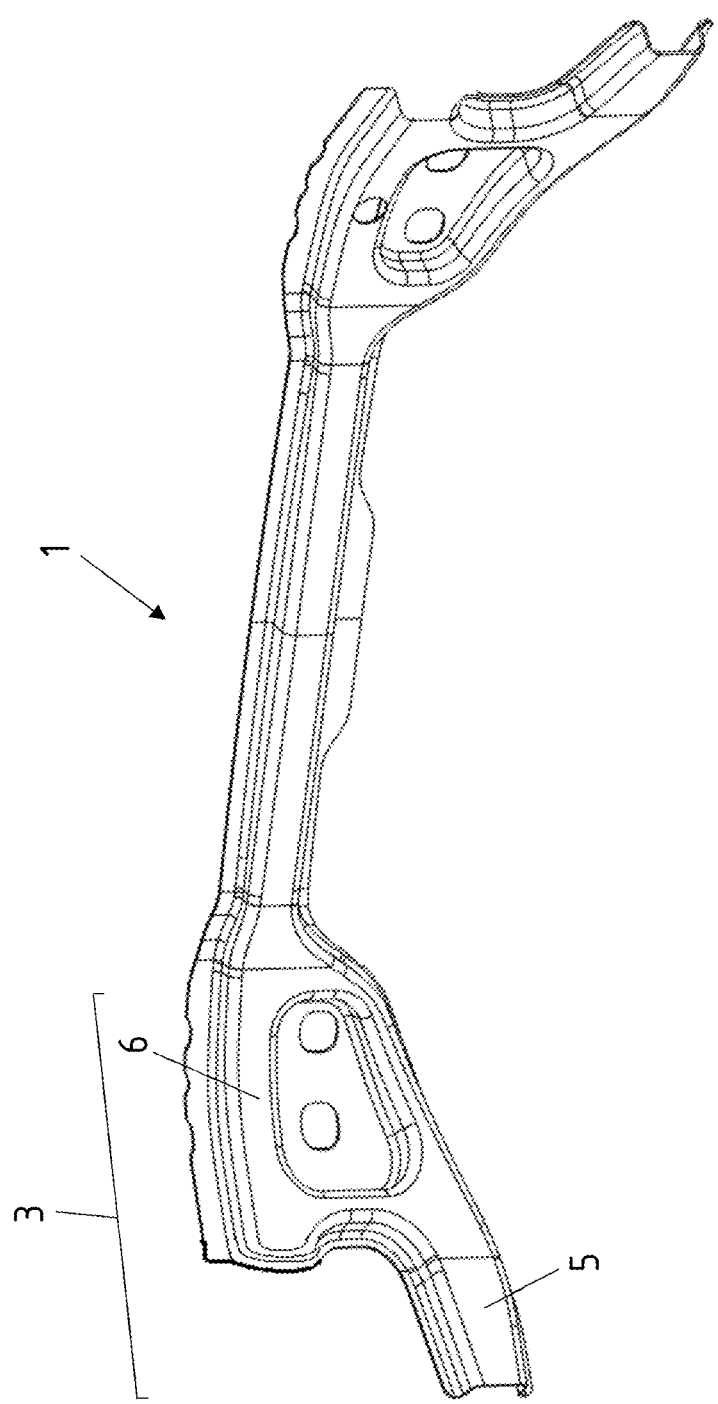
FIG. 5 an alternative embodiment variant of the crossmember according to the disclosure, FIG. 6 an embodiment variant of the bumper arrangement according to the disclosure, FIG. 7 a top view of the bumper arrangement according to the disclosure, FIG. 8 a side view of the bumper arrangement according to the disclosure, FIG. 9 an illustration corresponding to FIG. 8, additionally of the front side with a closing panel, FIG. 10 an embodiment variant analogous to FIG. 6, and FIG. 11 an embodiment variant of the bumper arrangement according to the disclosure, and FIG. 12 and FIG. 13 a respective crash scenario with a bumper arrangement according to the disclosure, and FIG. 14 and FIG. 15 an analogous embodiment variant of the bumper arrangement according to FIG. 6 of the disclosure.

FIG. 5 shows an alternative embodiment variant of the crossmember 1 according to the disclosure. Only the lower limb 5 is formed here as far as the outer end region. The upper limb 6 of the Y shape has been cut out at the end region. By this means, for example, further functional surfaces are able to be provided. For example, a radiator which is then not overlapped by the upper limb 6 is able to be arranged here. Sufficient crash safety is provided by the lower limb 5.

FIG. 6 and FIG. 7 show a second embodiment variant of a bumper arrangement 14 according to the disclosure. In this case, the end region is designed to run with an orientation obliquely downwards with respect to the vertical direction Z of the motor vehicle. The orientation running obliquely downwards is formed by an S-curve 16 or an S-shaped profile. The effect also achieved by this is that at least an outer end is arranged below a wheel center point 12 with respect to the vertical direction Z of the motor vehicle. The effect thus achieved in the event of a vehicle crash is that the end region or end portion 3 is hooked below the wheel center point 12. The lower flange 9 with respect to the vertical direction is enlarged at least partially in the region of the end portion 3 and in the region of the connecting portion. By this means, the impact surface for crash energy is correspondingly enlarged. Better support is therefore ensured. An offset is illustrated in the central portion, by which the crossmember 1 is offset vertically downwards in the central region 2 with respect to the vertical direction Z of the motor vehicle. For example, in the case of large motor vehicles, such as jeeps, off-road vehicles or SUVs, a sufficient crash property for a bumper-to-bumper crash is able to be therefore be ensured.

FIG. 7 shows the bumper arrangement in top view. With respect to the vertical direction Z of the motor vehicle, a curvature in the central region 2 is designed to be small and a curvature in the end regions is configured to be greater, and therefore, in relation thereto, a curvature in the end regions is configured to be greater such that the ends of the end portions 3 are shifted closer in the longitudinal direction X of the motor vehicle to a wheel 13 located behind them and thus strike more easily against a corresponding wheel 13 in the event of a crash.

Figure 8:
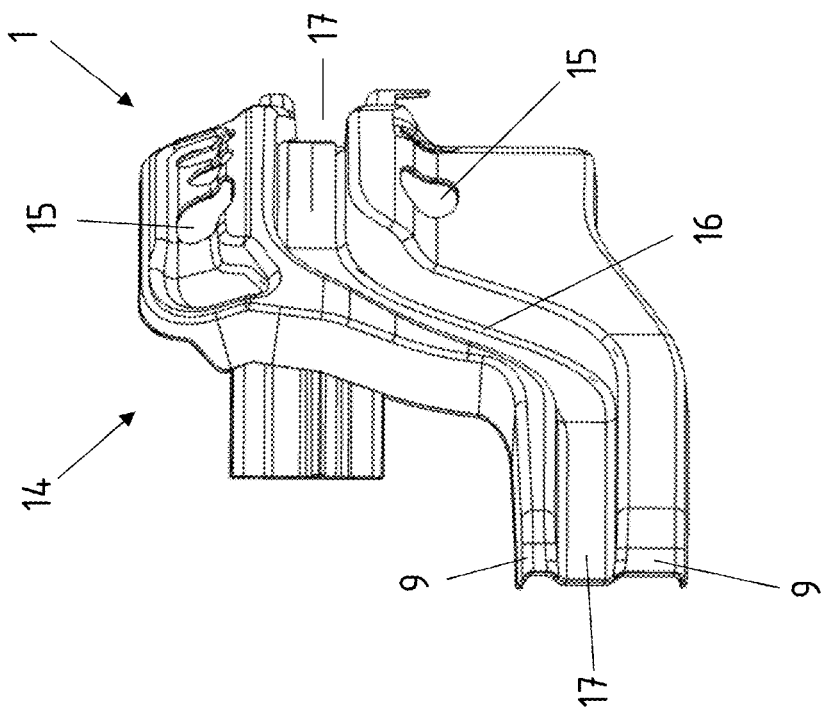

FIG. 8 shows a side view of the bumper arrangement 14 according to the disclosure. The crossmember 1 is designed as a complexly shaped formed component, by press forming. The crossmember 1 itself is able to have a number of functional openings 15, for example in order to fasten towing lugs, parking sensors or the like thereto. However, the crossmember 1 is of top-hat-shaped design in its main cross section. The top-hat-shaped profile also extends over the S-curve 16 into the outer end of the end region. Consequently, an upper flange and a lower flange 9 protrude from the top-hat shape 17. The cross section of the top-hat shape 17 changes only slightly over the profile and corresponds in the end region to at least 50%, more than 60%, more than 70% of the main cross section of the top-hat shape 17 in the central region 2.

Figure 9:
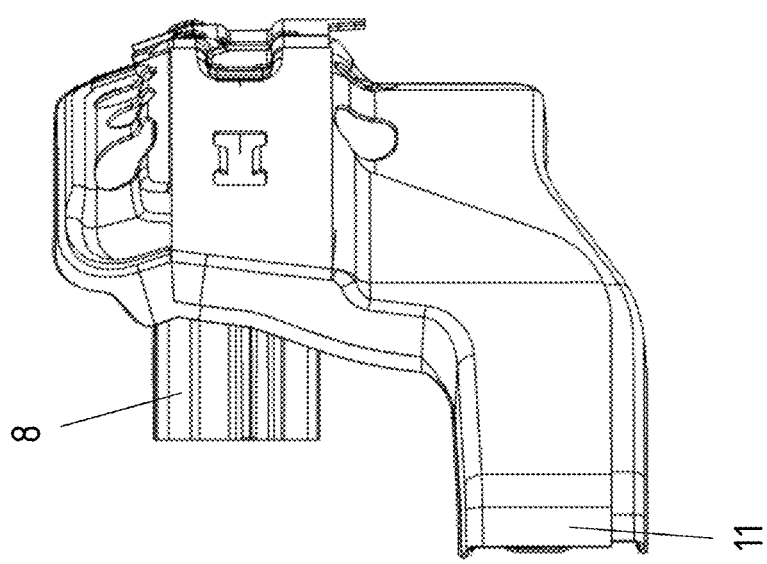

FIG. 9 shows an illustration according to FIG. 8, wherein a closing panel 11 is additionally attached here to the front side.

Figure 10:
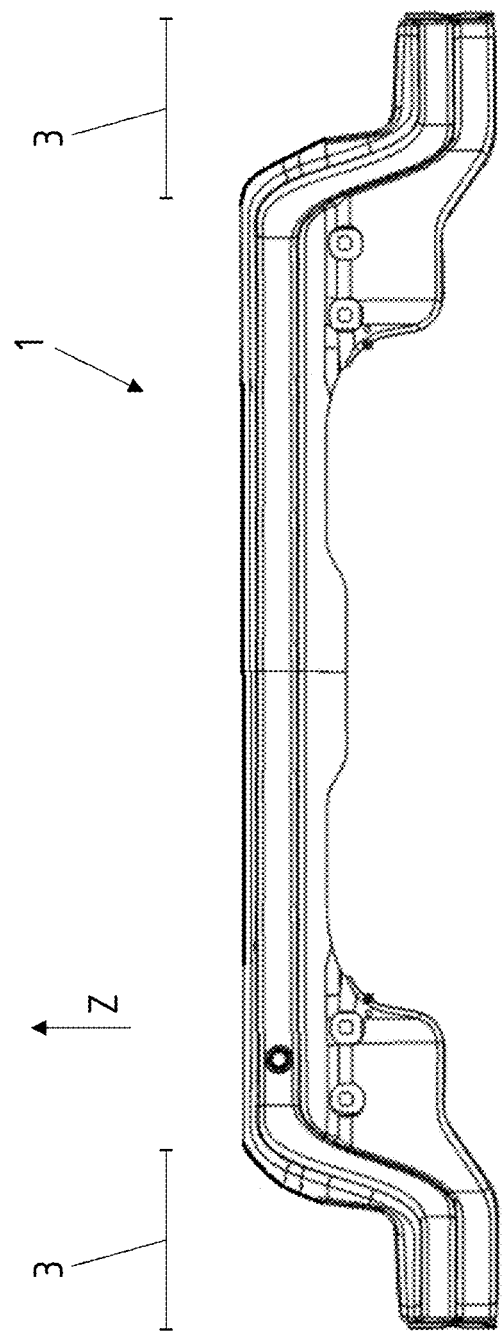

FIG. 10 shows an embodiment variant analogously to FIG. 6, with the offset not being formed here in the central region 2. An upper flange 9 in the region of the crash box connection is likewise omitted. However, the respective end region is designed with its S-curve 16 to run with an orientation obliquely downwards with respect to the vertical direction Z of the motor vehicle.

Figure 11:
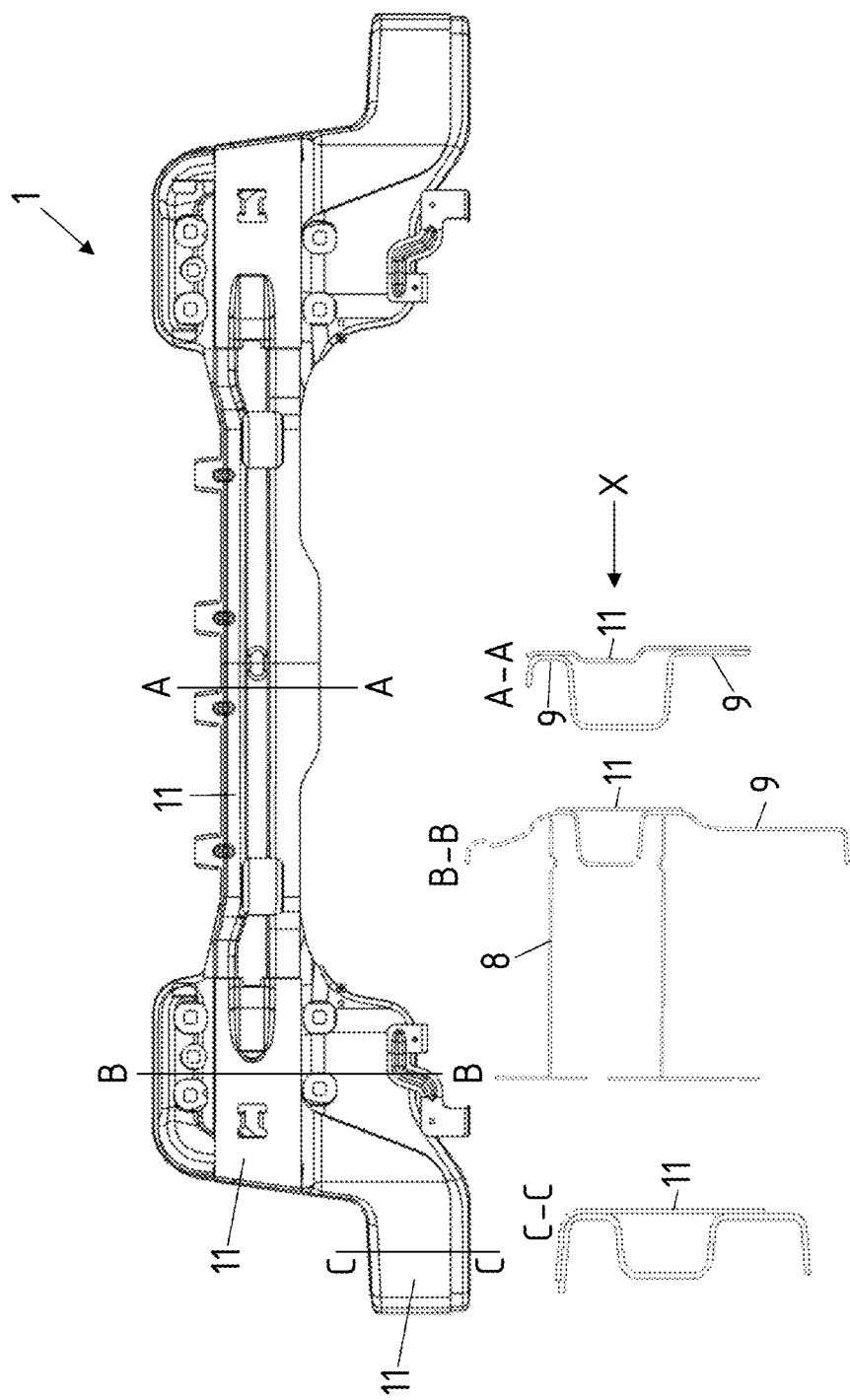

FIG. 11 shows an embodiment variant of the bumper arrangement 14 with three sectional views. A respective multi-part closing panel 11 is arranged in the illustration here. A central closing panel 11 is formed at A-A in the central region 2. A further closing panel patch is arranged in a first part of the end region and illustrated in the intersecting line B-B. A third closing panel is arranged in the outer end of the end portion and illustrated in the intersecting line C-C. The closing panel 11 in the central region 2 is also able to be have an inwardly deformed bead. The rigidity in the central region 2 against deformation in the longitudinal direction X of the motor vehicle is thereby increased further. The intersecting line B-B that the lower flange 9 with the top-hat shape 17 with respect to the vertical direction of the motor vehicle is significantly enlarged such that a greater striking surface is present here. The top-hat shape 17 then runs over the S-shaped end region and ends in the outer end of the end region, illustrated in the intersecting line C-C. The size of the cross-sectional profile of the top-hat shape 17 changes only slightly overall over the longitudinal profile, and therefore sufficient rigidity against deformation in the longitudinal direction X of the motor vehicle is provided over the entire width of the crossmember 1.

Figure 12:
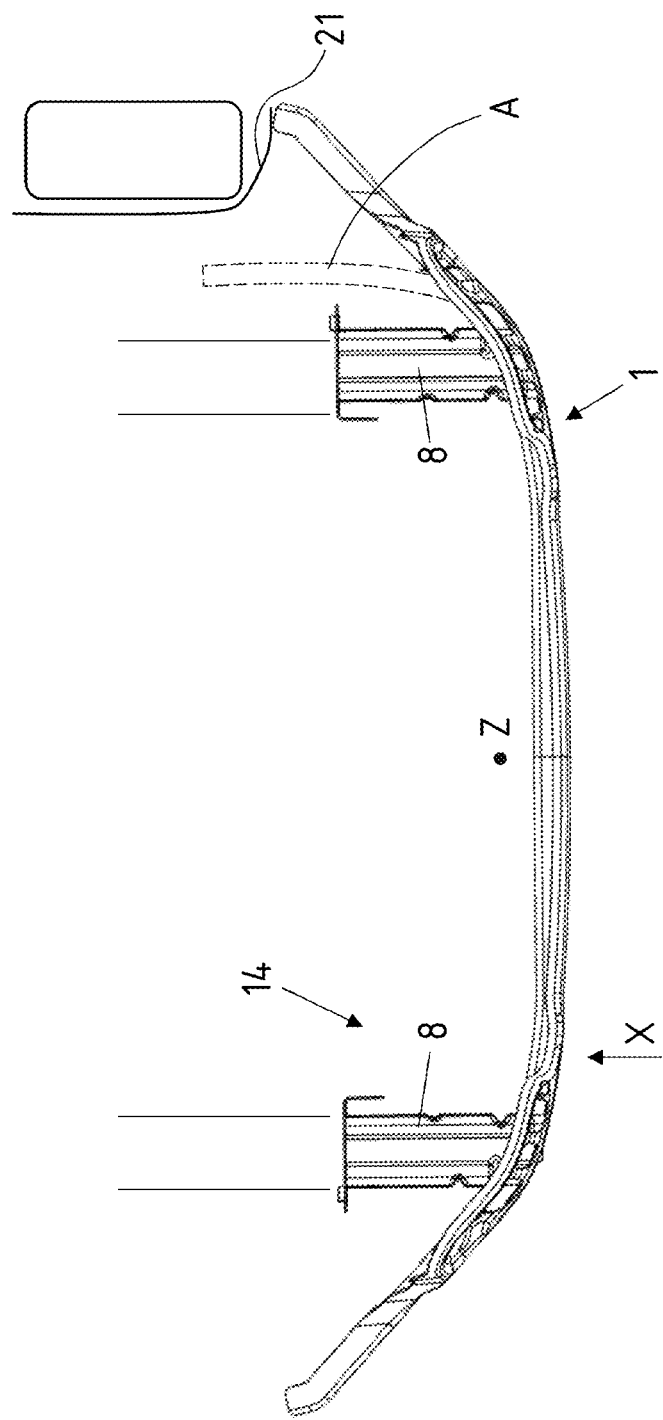

FIG. 12 and FIG. 13 show a respective crash scenario.

In case A in FIG. 12, sliding past the wheel 13 is provided due to inadequate stiffening of the end region because the downwardly drawn arm lacks profiling or has too low a profile depth and because of the end regions protruding for too short a distance or lacking overlapping. This is avoided according to the disclosure in that at least half of the wheel 13 in the transverse direction Y of the motor vehicle is overlapped and also appropriate stiffening is provided into the outer end of the end region because of the top-hat shape 17. Case A therefore cannot occur in the case of the bumper arrangement 14 according to the disclosure.

For case B which is illustrated in FIG. 13, the bumper carrier 14 is pressed against the wheel 13, by the crash box 8 and also a longitudinal member 18 located behind the crash box 8 being pressed in, as a result of which a second additional load path 19 to the main load path 20 occurs via the wheel 13 and a sill, not illustrated specifically, following behind the wheel 13 in the longitudinal direction X of the motor vehicle and in addition to a main load path 20 which takes place via the longitudinal member 18 itself.

FIG. 14 and FIG. 15 show an analogous embodiment variant of the bumper arrangement 14 according to FIG. 6. An additional crossmember 22 is arranged here. The latter is formed in the enlarged flange region of the S-curve. In addition, there is a reinforcing bead 23 in order to provide more extensive rigidity, and the reinforcing bead 23 is arranged between the actual top-hat profile of the crossmember 1 and the additional crossmember 22 such that, in the event of an impact, the additional crossmember 22 is not simply folded away or bent over and sufficient stiffening against deformation is provided here. A corresponding additional crossmember 22 is also able to be arranged in the embodiment variant according to FIG. 1 et seq., but is not described in more detail here.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations are able to be made hereto without departing from the spirit and scope of the disclosure.

The invention claimed is:

1. A bumper arrangement for a motor vehicle, comprising:
a plurality of crash boxes; and
a crossmember coupled to the motor vehicle by each of the plurality of crash boxes,
wherein the crossmember comprises a hollow profile having an opening on one side, the opening faces forward in a longitudinal direction of the motor vehicle, the crossmember has end portions, and each of the end portions extends obliquely downwards relative to a vertical direction of the motor vehicle, and an outer portion of each of the end portions is below a wheel center point of the motor vehicle with respect to the vertical direction of the motor vehicle.

2. The bumper arrangement according to claim 1, wherein the plurality of crash boxes are in a connecting region of the crossmember between a central region of the crossmember and a corresponding end portion of the end portions.

3. The bumper arrangement according to claim 1, wherein each of the end portions extends from a central region of the crossmember and downwards directly in front of a crash box of the plurality of crash boxes.

4. The bumper arrangement according to claim 1, further comprising a closing panel configured to close the opening of the crossmember.

5. The bumper arrangement according to claim 1, wherein each of the end portions extends downwards relative to the vertical direction of the motor vehicle in an S-shaped manner.

6. The bumper arrangement according to claim 1, wherein each of the end regions is Y-shaped having one limb that extends downwards relative to the vertical direction of the motor vehicle.

7. The bumper arrangement according to claim 1, wherein the crossmember has flanges protruding upwards and downwards in the vertical direction of the motor vehicle, and each of the flanges is at least partially enlarged in a corresponding end portion of the end portions.

8. The bumper arrangement according to claim 1, wherein the crossmember is curved and extends towards a vertical axis of the motor vehicle, and each of the end portions of the crossmember has a curvature greater than a curvature of a central region of the crossmember.

9. The bumper arrangement according to claim 1, wherein the crossmember has a cross section that is top-hat shaped and extends into the end portions.

10. The bumper arrangement according to claim 9, wherein each of the plurality of crash boxes engages the top-hat shaped cross section such that an upper part and a lower part of a crash box of the plurality of crash boxes overlaps the top-hat shaped cross section and abuts a rear side of a front wall of the crossmember.

11. The bumper arrangement according to claim 1, wherein the crossmember is an integral component.

12. The bumper arrangement according to claim 1, wherein the crossmember is hot formed and press hardened.

13. The bumper arrangement according to claim 1, wherein the crossmember is a sheet metal-formed component.

14. The bumper arrangement according to claim 1, wherein the crossmember comprises a steel alloy.

15. The bumper arrangement according to claim 1, wherein the crossmember has a tensile strength Rm of greater than 1300 MPa.

16. The bumper arrangement according to claim 1, wherein the crossmember is formed in one piece with, and in the same material as, the end portions, in the form of a sheet metal formed component.

17. A bumper arrangement for a motor vehicle, comprising:
a plurality of crash boxes; and a crossmember coupled to the motor vehicle by each of the plurality of crash boxes, wherein the crossmember comprises a hollow profile having an opening on one side, the opening faces forward in a longitudinal direction of the motor vehicle, the crossmember has end portions, and each of the end portions extends obliquely downwards relative to a vertical direction of the motor vehicle, and each of the end portions extends from a central region of the crossmember and downwards at a width of a crash box of the plurality of crash boxes.

18. A bumper arrangement for a motor vehicle, comprising:

a plurality of crash boxes; and a crossmember coupled to the motor vehicle by each of the plurality of crash boxes, wherein the crossmember comprises a hollow profile having an opening on one side, the opening faces forward in a longitudinal direction of the motor vehicle, the crossmember has end portions, and each of the end portions extends obliquely downwards relative to a vertical direction of the motor vehicle, and each of the end portions extends from a central region of the crossmember and downwards after a crash box of the plurality of crash boxes.

* * * * *